(12) United States Patent
Blake et al.

(10) Patent No.: US 10,387,933 B2
(45) Date of Patent: Aug. 20, 2019

(54) TECHNOLOGIES FOR IDENTIFYING PRODUCT SOURCES

(71) Applicant: 84.51 LLC, Cincinnati, OH (US)

(72) Inventors: William Blake, Cincinnati, OH (US); Heidi Salava, Cincinnati, OH (US); Brian Rock, Cincinnati, OH (US); Michael Roney, Cincinnati, OH (US)

(73) Assignee: 84.51 LLC, Cincinnati, OH (US)

( * ) Notice: Subject to any disclaimer, the term of this patent is extended or adjusted under 35 U.S.C. 154(b) by 225 days.

(21) Appl. No.: 15/236,014

(22) Filed: Aug. 12, 2016

(65) Prior Publication Data
US 2017/0046761 A1   Feb. 16, 2017

Related U.S. Application Data (60) Provisional application No. 62/204,267, filed on Aug. 12, 2015.

(51) Int. Cl.
*G06Q 30/00* (2012.01)
*G06Q 30/06* (2012.01)
*G06F 16/951* (2019.01)

(52) U.S. Cl.
CPC ....... *G06Q 30/0623* (2013.01); *G06F 16/951* (2019.01); *G06Q 30/0601* (2013.01); *G06Q 30/0641* (2013.01)

(58) Field of Classification Search
CPC .......... G06Q 30/0623; G06Q 30/0641; G06Q 30/0601; G06F 17/30864; G06F 17/30867
(Continued)

(56) References Cited

U.S. PATENT DOCUMENTS 5,978,773 A * 11/1999 Hudetz ............. G06F 17/30879
   705/23

7,441,706 B1 * 10/2008 Schuessler ........ G06F 17/30879
   235/462.01
(Continued)

FOREIGN PATENT DOCUMENTS

WO   WO-2014106037 A1 * 7/2014 ....... G06F 16/24553

OTHER PUBLICATIONS

International Search Report and Written Opinion, issued in corresponding International Patent Application No. PCT/US16/46849, dated Nov. 2, 2016, 18 pages.
(Continued)

*Primary Examiner* — Yogesh C Garg
(74) *Attorney, Agent, or Firm* — Pillsbury Winthrop Shaw Pittman, LLP (57) ABSTRACT

Technologies for identifying product sources include a product source management server. The product source management server receives an unidentified Universal Product Code (UPC) corresponding to a product of a manufacturer. The unidentified UPC is compared to a library including reference Universal Product Codes (UPCs) and corresponding manufacturer identification data to identify the manufacturer of the product. A brand of the product is determined when the product manufacturer is not identified via the reference UPCs. The determined brand is compared to another library including reference brands and corresponding manufacturer identification data to identify the product manufacturer. When the determined brand does not match one of the reference brands, the product source management server compares product description data corresponding to the product to a different library including reference product description strings. The product manufacturer may be determined based on a matching reference product description string. Other embodiments are described and claimed.

11 Claims, 4 Drawing Sheets

(58) Field of Classification Search
USPC .................................. 705/26.1, 26.61, 27.1
See application file for complete search history.

(56) References Cited

U.S. PATENT DOCUMENTS

| | | | |
|---|---|---|---|
| 7,441,710 B2 | 10/2008 | Perkowski | |
| 8,145,531 B1* | 3/2012 | Ptak | G06Q 20/208 |
| | | | 235/381 |
| 8,321,300 B1* | 11/2012 | Bockius | G06Q 20/123 |
| | | | 705/26.1 |
| 8,374,920 B2 | 2/2013 | Hedges et al. | |
| 8,579,187 B2 | 11/2013 | Normile | |
| 2009/0119143 A1* | 5/2009 | Silver | G06Q 30/02 |
| | | | 705/51 |
| 2012/0300860 A1 | 11/2012 | Washiro | |
| 2012/0303412 A1* | 11/2012 | Etzioni | G06Q 30/06 |
| | | | 705/7.31 |
| 2013/0346153 A1* | 12/2013 | Kraus | G06Q 30/0623 |
| | | | 705/7.31 |
| 2014/0214563 A1 | 7/2014 | Argue et al. | |
| 2014/0258165 A1 | 9/2014 | Heil | |
| 2014/0279248 A1 | 9/2014 | Westphal | |
| 2015/0088933 A1 | 3/2015 | Schofield et al. | |
| 2015/0237056 A1* | 8/2015 | Arnold | G06Q 30/0201 |
| | | | 726/4 |
| 2016/0078473 A1* | 3/2016 | Dabbiru | G06Q 30/0246 |
| | | | 705/14.44 |
| 2016/0253679 A1* | 9/2016 | Venkatraman | G06Q 30/0185 |
| | | | 705/310 |

OTHER PUBLICATIONS

International Preliminary Report on Patentability dated Jul. 26, 2017 issued in corresponding International Application No. PCT/US2016/046849.
International Preliminary Report on Patentability dated Nov. 29, 2018 and dated Mar. 22, 2019, issued in corresponding International Patent Application No. PCT/US2016/046849.

* cited by examiner

TECHNOLOGIES FOR IDENTIFYING PRODUCT SOURCES

CROSS REFERENCE TO RELATED APPLICATION

This application claims the benefit of U.S. Provisional Patent Application Ser. No. 62/204,267, filed on Aug. 12, 2015, entitled TECHNOLOGIES FOR IDENTIFYING PRODUCT SOURCES, the disclosure of which is hereby incorporated by reference in its entirety.

TECHNICAL FIELD

Embodiments of the technologies described herein relate, in general, to retailer and supplier collaboration technologies, and in particular to an electronic platform for identifying product sources.

SUMMARY

In an embodiment, the present disclosure is directed, in part, to a method for identifying product sources. The method includes receiving, by a product source management server, an unidentified Universal Product Code (UPC) that corresponds to a product of a manufacturer. The method also includes comparing, by the product source management server, the unidentified UPC to a first library including a plurality of reference Universal Product Codes (UPCs). Each reference UPC is associated with first manufacturer identification data that identifies the manufacturer of the product corresponding to the reference UPC. In addition, the method includes identifying, by the product source management server and in response to a determination that the unidentified UPC matches one of the reference UPCs of the first library, the manufacturer of the product corresponding to the unidentified UPC as the manufacturer of the product corresponding to the matching reference UPC. The method also includes determining, by the product source management server and in response to a determination that the unidentified UPC does not match one of the reference UPCs of the first library, a brand of the product corresponding to the unidentified UPC based at least in part on product description data associated with the product. The method further includes comparing, by the product source management server, the determined brand of the product corresponding to the unidentified UPC to a second library including a plurality of reference brands. Each reference brand is associated with second manufacturer identification data that identifies the manufacturer of the reference brand. Additionally, the method includes identifying, by the product source management server and in response to a determination that the determined brand of the product corresponding to the unidentified UPC matches one of the reference brands of the second library, the manufacturer of the product corresponding to the unidentified UPC as the manufacturer of the matching reference brand. The method may also include comparing, by the product source management server and in response to a determination that the determined brand of the product corresponding to the unidentified UPC does not match one of the reference brands of the second library, the product description data associated with the product to a third library. In such cases, the third library includes a plurality of reference product description strings and each reference product description string is associated with product identification data that identifies the product and brand corresponding to the reference product description string.

The method can also include identifying, by the product source management server and in response to a determination that the product description data associated with the product corresponding to the unidentified UPC matches one of the reference product description strings of the third library, the manufacturer of the product corresponding to the unidentified UPC based at least in part on the product identification data associated with the matching reference product description string.

In another embodiment, the present disclosure is directed, in part, to a product source management server for identifying product sources. The product source management server includes at least one processor and non-transitory computer readable medium having instructions stored thereon which when executed by a processor cause the processor to receive an unidentified Universal Product Code (UPC) that corresponds to a product of a manufacturer. The instructions further cause the processor of the product source management server to compare the unidentified UPC to a first library including a plurality of reference Universal Product Codes (UPCs). Each reference UPC is associated with first manufacturer identification data that identifies the manufacturer of the product corresponding to the reference UPC. The instructions also cause the processor to identify, in response to a determination that the unidentified UPC matches one of the reference UPCs of the first library, the manufacturer of the product corresponding to the unidentified UPC as the manufacturer of the product corresponding to the matching reference UPC. In addition, the instructions further cause the processor to determine, in response to a determination that the unidentified UPC does not match one of the reference UPCs of the first library, a brand of the product corresponding to the unidentified UPC based at least in part on product description data associated with the product. The instructions also cause the processor of the product source management server to compare, the determined brand of the product corresponding to the unidentified UPC to a second library including a plurality of reference brands. Each reference brand is associated with second manufacturer identification data that identifies the manufacturer of the reference brand. The instructions also cause the processor to identify, in response to a determination that the determined brand of the product corresponding to the unidentified UPC matches one of the reference brands of the second library, the manufacturer of the product corresponding to the unidentified UPC as the manufacturer of the matching reference brand. The instructions may also cause the processor of the product source management server to compare, in response to a determination that the determined brand of the product corresponding to the unidentified UPC does not match one of the reference brands of the second library, the product description data associated with the product to a third library. In such cases, the third library includes a plurality of reference product description strings and each reference product description string is associated with product identification data that identifies the product and brand corresponding to the reference product description string. The instructions may further cause the processor to identify, in response to a determination that the product description data associated with the product corresponding to the unidentified UPC matches one of the reference product description strings of the third library, the manufacturer of the product corresponding to the unidentified UPC based at least in part on the product identification data associated with the matching reference product description string.

In another embodiment, the present disclosure is directed, in part, to a method of updating product source libraries. The method includes obtaining, by a product source management server and from an electronic data source, at least one of manufacturer identification data that identifies a manufacturer of a product corresponding to a Universal Product Code (UPC), brand identification data that identifies a brand of the product, and product description data that describes the product. The method further includes determining, by the product source management server, whether the at least one of the manufacturer identification data, the brand identification data, and the product description data obtained from the electronic data source includes at least one of new manufacturer identification data, new brand identification data, and new product description data. Additionally, the method includes updating, by the product source management server, one or more of previously-obtained manufacturer identification data, previously-obtained brand identification data, and previously-obtained product description data corresponding to the UPC in response to a determination that the at least one of the manufacturer identification data, the brand identification data, and the product description data obtained from the electronic data source includes at least one of new manufacturer identification data, new brand identification data, and new product description data corresponding to the UPC.

In yet another embodiment, the present disclosure is directed, in part, to a product source management server for updating product source data. The product source management server includes at least one processor and non-transitory computer readable medium having instructions stored thereon which when executed by a processor cause the processor to obtain, from an electronic data source, at least one of manufacturer identification data that identifies a manufacturer of a product corresponding to a Universal Product Code (UPC), brand identification data that identifies a brand of the product, and product description data that describes the product. The instructions of the product source management server also cause the processor to determine whether the at least one of the manufacturer identification data, the brand identification data, and the product description data obtained from the electronic data source comprises at least one of new manufacturer identification data, new brand identification data, and new product description data. Additionally, the instructions cause the processor to update one or more of previously-obtained manufacturer identification data, previously-obtained brand identification data, and previously-obtained product description data corresponding to the UPC in response to a determination that the at least one of the manufacturer identification data, the brand identification data, and the product description data obtained from the electronic data source comprises at least one of new manufacturer identification data, new brand identification data, and new product description data corresponding to the UPC.

BRIEF DESCRIPTION OF THE DRAWINGS

The present disclosure will be more readily understood from a detailed description of some example embodiments taken in conjunction with the following figures in which.

DETAILED DESCRIPTION

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Figure 1:
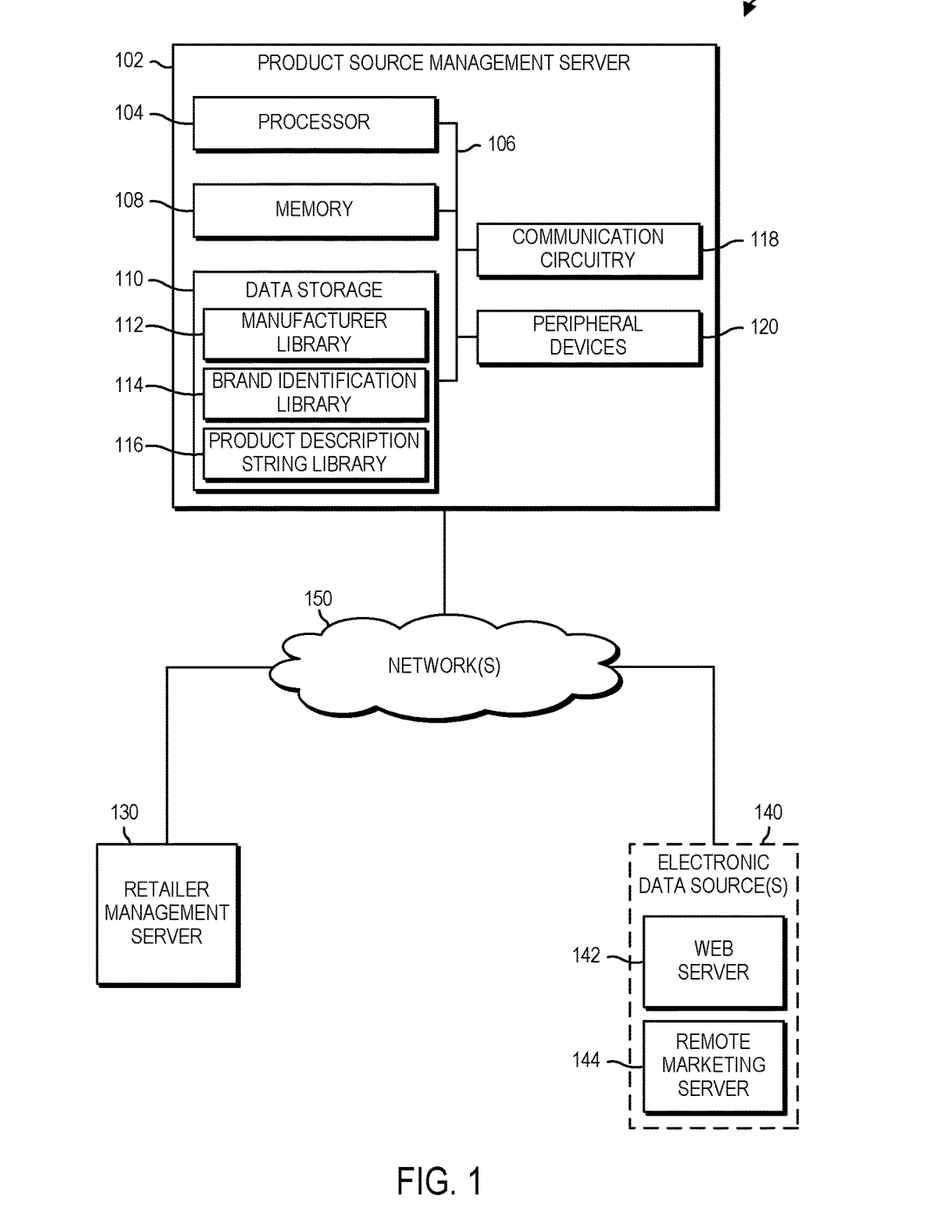
FIG. 1 is a simplified block diagram of at least one embodiment of a system for identifying product sources.

Referring now to FIG. 1, in one embodiment, a system 100 for identifying the source of products includes a product source management server 102 configured to communicate with a retailer management server 130 and one or more electronic data sources 140 over one or more networks 150. In some embodiments, the electronic data source(s) 140 include a web server 142 and a remote marketing server 144. In operation, the product source management server 102 receives a list of active universal product codes (UPCs) from the retailer management server 130. Subsequently, the product source management server 102 compares an active UPC of the list to UPCs of the manufacturer library 112. Each UPC of the manufacturer library 112 can be associated with the name of the manufacturer of the product that corresponds to that UPC. If the product source management server 102 successfully matches the active UPC to a UPC of the manufacturer library 112, the manufacturer (or ultimate owner) of the product corresponding to the active UPC can be determined.

In embodiments in which the product source management server 102 is not able to match the active UPC to a UPC of the manufacturer library 112, the product source management server 102 determines a product description associated with the active UPC. Based on the product description, the product source management server 102 subsequently determines a brand of the product that corresponds to the active UPC. The product source management server 102 then compares the determined brand to the brand identification library 114, which includes names of the manufacturers of different brands. If the product source management server 102 successfully matches the determined brand to a brand of the brand identification library 114, the manufacturer (or ultimate owner) of the brand, and therefore the active UPC, can be determined.

In embodiments in which the product source management server 102 is not able to match the determined brand to a brand of the brand identification library 114, the product source management server 102 compares the product description to the product description string library 116. In doing so, the product source management server 102 determines whether all (or a portion) of the product description matches a product description string of the product description string library 116. As discussed in more detail below, each string of the product description string library 116 can be associated with a particular product and brand corresponding to that product. If the product source management server 102 successfully matches all or a portion of the product description to a product description string of the product description string library 116, the corresponding brand and product can be determined. Thereafter, the product source management server 102 can determine the corresponding manufacturer as discussed above. It should be appreciated that the product source management server 102 can determine the manufacturer (or ultimate owner) of each active UPC of the list of active UPCs. Additionally, in some embodiments, the manufacturer library 112, the brand identification library 114, and the product description string library 116 can be revised or updated via information or data obtained from the electronic data source(s) 140.

The product source management server 102 may be embodied as any type of server or computing device capable of processing, communicating, storing, maintaining, and transferring data. For example, the product source management server 102 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the product source management server 102 may be embodied as a computing device integrated with other systems or subsystems. In the illustrative embodiment of FIG. 1, the product source management server 102 includes a processor 104, a system bus 106, a memory 108, a data storage 110, communication circuitry 118, and one or more peripheral devices 120. Of course, the product source management server 102 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 108, or portions thereof, may be incorporated in the processor 104 in some embodiments. Furthermore, it should be appreciated that the product source management server 102 may include other components, sub-components, and devices commonly found in a computer and/or computing device, which are not illustrated in FIG. 1 for clarity of the description.

The processor 104 may be embodied as any type of processor capable of performing the functions described herein. For example, the processor 104 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or any other type of processor or processing/controlling circuit or controller.

In various configurations, the product source management server 102 includes a system bus 106 for interconnecting the various components of the product source management server 102. The system bus 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the product source management server 102. In some embodiments, the product source management server 102 can be integrated into one or more chips such as a programmable logic device or an application specific integrated circuit (ASIC). In such embodiments, the system bus 106 may form a portion of a system-on-a-chip (SoC) and be incorporated, along with the processor 104, the memory 108, and other components of the product source management server 102, on a single integrated circuit chip.

The memory 108 may be embodied as any type of volatile or non-volatile memory or data storage capable of performing the functions described herein. For example, the memory 108 may be embodied as read only memory (ROM), random access memory (RAM), cache memory associated with the processor 104, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 108 may store various data and software used during operation of the product source management server 102 such as operating systems, applications, programs, libraries, and drivers.

The data storage 110 may be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage 110 includes a manufacturer library 112, a brand identification library 114, and a product description string library 116. It should be appreciated that the data storage 110 can include other libraries, in other embodiments. The manufacturer library 112 can include one or more universal product codes (UPCs). Each UPC of the manufacturer library 112 can be associated with a manufacturer name or other data that identifies the manufacturer of the product for which the UPC corresponds. The brand identification library 114 can include one or more brands or brand identifiers. Each brand of the brand identification library 114 can be associated with a manufacturer name or other data that identifies the manufacturer that owns or controls that brand. The product description string library 116 can include one or more strings that include all or portions of product descriptions. Each string can be associated with a particular product and the brand corresponding to that product. As discussed in more detail below, the product source management server 102 can perform fuzzy matching or any other type of search logic on product description data to identify a corresponding product and brand.

The communication circuitry 118 of the product source management server 102 may be embodied as any type of communication circuit, device, interface, or collection thereof, capable of enabling communications between the product source management server 102 and the retailer management server 130, electronic data sources 140, and/or other computing devices. For example, the communication circuitry 118 may be embodied as one or more network interface controllers (NICs), in some embodiments. The communication circuitry 118 may be configured to use any one or more communication technologies (e.g., wireless or wired communications) and associated protocols (e.g., Ethernet, Wi-Fi®, WiMAX, etc.) to effect such communication.

In some embodiments, the product source management server 102, retailer management server 130, electronic data sources 140, and/or other computing devices may communicate with each other over the network(s) 150. The network(s) 150 may be embodied as any number of various wired and/or wireless communication networks. For example, the network(s) 150 may be embodied as or otherwise include a local area network (LAN), a wide area network (WAN), a cellular network, or a publicly-accessible, global network such as the Internet. Additionally, the network(s) 150 may include any number of additional devices to facilitate communication between the product source management server 102, the product source management server 102, retailer management server 130, electronic data sources 140, and/or other computing devices.

Additionally, in some embodiments, the product source management server 102 may further include one or more peripheral devices 120. Such peripheral devices 120 may include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In some embodiments, the product source management server 102 may establish an environment during operation. The environment may include various modules, components, sub-components, and devices commonly found in a computing device, which are not illustrated in the figures for clarity of the description. The various modules, components, sub-components, and devices of the environment may be embodied as hardware, firmware, software, or a combination thereof. For example, one or more of the modules, components, sub-components, and devices of the environment may be embodied as a processor and/or a controller configured to provide the functionality described herein.

The retailer management server 130 may be embodied as any type of computing device capable of performing the functions described herein. For example, the retailer management server 130 may be embodied as a server, a microcomputer, a minicomputer, a mainframe, a desktop computer, a laptop computer, a custom chip, an embedded processing device, or other computing device and/or suitable programmable device. As such, the retailer management server 130 may include devices and structures commonly found in a computing device such as processors, memory devices, communication circuitry, and data storages, which are not shown in FIG. 1 for clarity of the description. The retailer management server 130 may be configured to maintain a list of active universal product codes (UPCs) for a retailer. The active UPCs may be indicative of the products sold by the retailer during the normal course of business.

The electronic data sources 140 may be embodied as any type of data source that maintains or provides manufacturer data, brand data, product data, or any other type of data. For example, in some embodiments, the electronic data sources 140 may include a web server 142. In another example, the electronic data sources 140 can include a remote marketing server 144. The manufacturer data, brand data, and/or product data maintained and/or provided by the electronic data sources 140 may be embodied as any type of data that describes, or is indicative of, a manufacturer, a brand, or a product. For example, in some embodiments, the data maintained and/or provided by the electronic data sources 140 may be embodied as a manufacturer's website that lists its brands and/or products. In another example, the data maintained and/or provided by the electronic data sources 140 may be embodied as an e-commerce website that lists products and corresponding UPCs. In yet another example, the data maintained and/or provided by the electronic data sources 140 may be embodied as a website that includes news articles relating to manufacturers, brands, and products. It should be appreciated that the data maintained and/or provided by the electronic data sources 140 may be embodied as any other type of data relating to manufacturers, brands, and products. As discussed in more detail below, such data can be used by the product source management server 102 to revise and/or update data stored in the manufacturer library 112, the brand identification library 114, and/or the product description string library 116.

Figure 2:
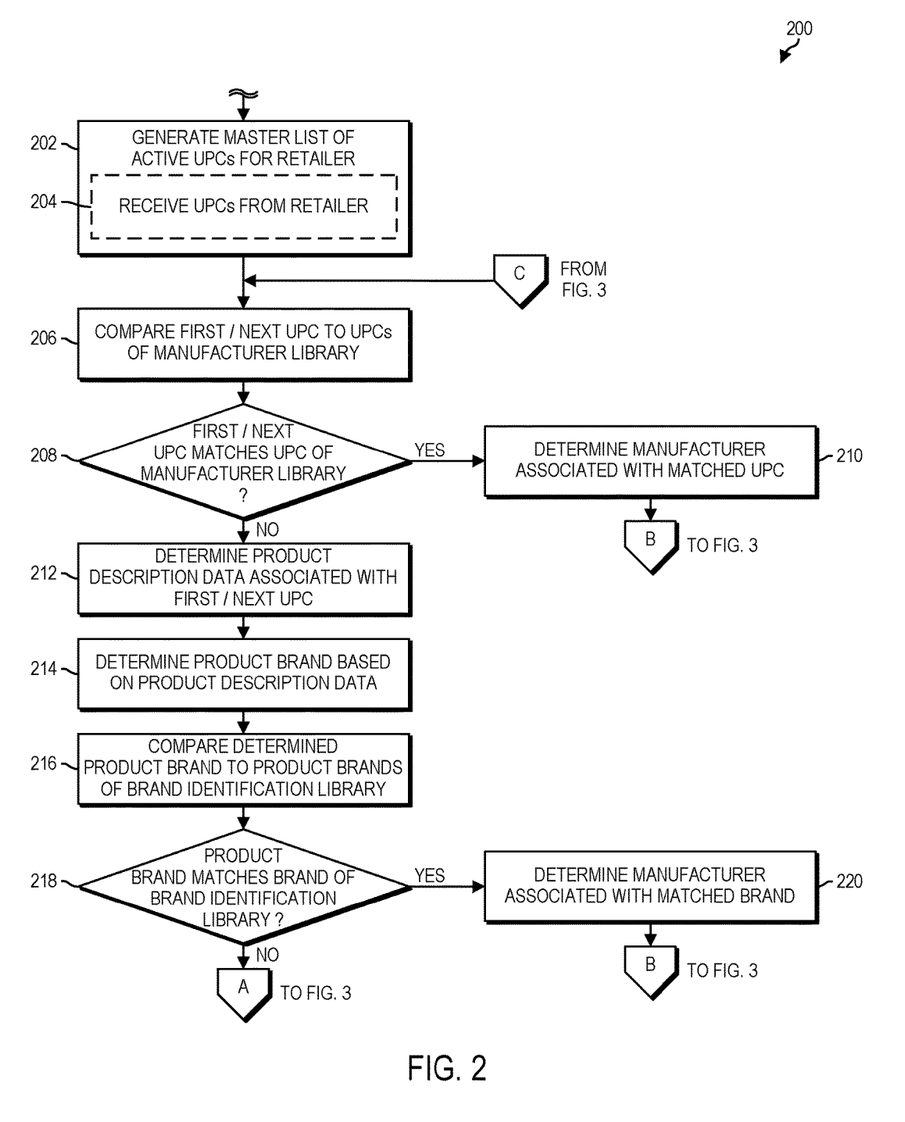
FIGS. 2-3 are a simplified flow diagram of at least one embodiment of a method for identifying product sources that may be executed by the product source management server of FIG. 1.
Figure 3:
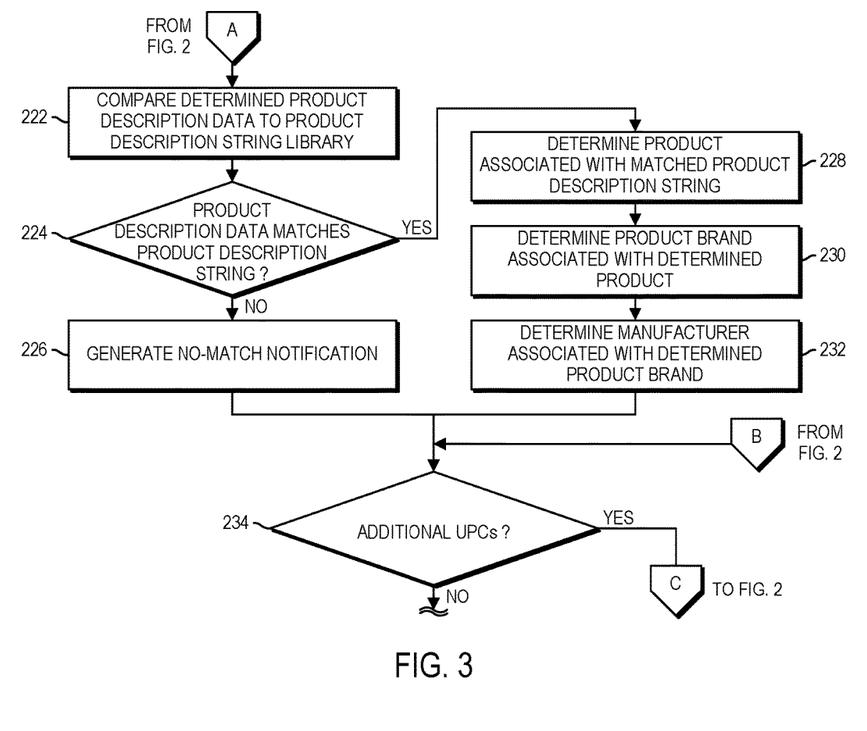

Referring now to FIGS. 2-3, a method 200 for identifying product sources that may be executed by the product source management server 102 begins with block 202. In block 202, the product source management server 102 generates a master list of active UPCs for a retailer. To do so, in block 204, the product source management server 102 may receive a list of active UPCs from the retailer management server 130. Each UPC may correspond to a different product sold or carried by a retailer. As discussed above, each UPC may be associated with a product manufactured or supplied by a different manufacturer or "ultimate owner" or "ultimate source."

In block 206, the product source management server 102 compares the first/next UPC of the master list of active UPCs to one or more UPCs of the manufacturer library 112. It should be appreciated that during the first iteration of the method 200, the product source management server 102 compares the first active UPC to the one or more UPCs of the manufacturer library 112. Subsequently, in decision block 208, the product source management server 102 determines whether the first/next UPC matches one of the UPCs of the manufacturer library 112. If, in decision block 208, the product source management server 102 determines that the first/next UPC matches one of the UPCs of the manufacturer library 112, the method 200 advances to block 210. If, however, the product source management server 102 determines instead that the first/next UPC does not match any of the UPCs of the manufacturer library 112, the method 200 advances to block 212.

In block 210, the product source management server 102 determines the manufacturer associated with the matched UPC. As discussed, each UPC of the manufacturer library 112 can be associated with a manufacturer name or other data that identifies the manufacturer of the product for which the UPC corresponds. The method 200 then advances to decision block 234.

Referring back to block 212, in response to determining in decision block 208 that the first/next UPC does not match one of the UPCs of the manufacturer library 112, the product source management server 102 determines product description data associated with the first/next UPC. To do so, the product source management server 102 can request the product description data from a remote product description repository (e.g., a remote UPC database) or it may locally store the product description data. The product description data may include a brand name, a product name, a product size or weight, and/or any other type of information that describes a product associated with a UPC.

In block 214, the product source management server 102 determines the product brand for the product associated with the first/next UPC based on the product description data. As discussed, in some embodiments, the product description data includes a brand name. In such embodiments, the product source management server 102 can parse the product description data to obtain the brand name. In block 216, the product source management server 102 compares the determined product brand to product brands of the brand identification library 114. Subsequently, in decision block 218, the product source management server 102 determines whether the determined product brand matches one of the product brands of the brand identification library 114. If, in decision block 218, the product source management server 102 determines that the determined product brand matches one of the product brands of the brand identification library 114, the method 200 advances to block 220. If, however, the product source management server 102 determines instead that the determined product brand does not match one of the product brands of the brand identification library 114, the method 200 advances to block 222.

In block 220, the product source management server 102 determines the manufacturer associated with the product brand of the brand identification library 114 that matches the determined product brand. In some embodiments, each product brand of the brand identification library 114 can be associated with the name of the manufacturer of that product. In other embodiments, a separate library can be maintained that associates product brands to manufacturers. Regardless, the method 200 then advances to decision block 234.

Referring back to block 222, in response to determining in decision block 218 that the determined product brand does not match one of the product brands of the brand identification library 114, the product source management server 102 compares the determined product description data for the product associated with the first/next UPC to one or more product description strings of the product description string library 116. Subsequently, in decision block 224, the product source management server 102 determines whether the product description data for the product associated with the first/next UPC matches any of the product description strings of the product description string library 116. In some embodiments, the product source management server 102 can perform fuzzy matching or any other search technique to determine whether the product description data, or a portion thereof, matches any of the product description strings of the product description string library 116. If, in decision block 224, the product source management server 102 determines that the product description data matches one of the product description strings of the product description string library 116, the method 200 advances to block 228. If, however, the product source management server 102 determines instead that the product description data does not match any of the product description strings of the product description string library 116, the method 200 advances to block 226.

In block 226, the product source management server 102 generates a no-match notification message. In some embodiments, the no-match notification message can be displayed to a user or operator of the product source management server 102 and can indicate that manual intervention is required. It should be appreciated that the no-match notification message can also be configured to cause the product source management server 102 to search and/or crawl electronic sources (e.g., the electronic data sources 140) to determine missing information (e.g., manufacturer information, brand information, product information, etc.).

In block 228, the product source management server 102 determines a product associated with the matching product description string of the product description string library 116. In some embodiments, each product description string can be associated with the name of the product for which it corresponds. Subsequently, in block 230, the product source management server 102 determines the product brand associated with the determined product. To do so, in some embodiments, the product source management server 102 can compare the product brand to the product brands of the brand identification library 114. Next, in block 232, the product source management server 102 determines the manufacturer associated with the determined product brand. As discussed, each product brand of the brand identification library 114 can be associated with the name of the manufacturer of that product. In other embodiments, a separate library can be maintained that associates product brands to manufacturers.

In decision block 234, the product source management server 102 determines whether there are any additional or remaining UPCs of the master list of active UPCs. If, in decision block 234, the product source management server 102 determines that there are no additional or remaining UPCs of the master list of active UPCs, the method 200 completes. If, however, the product source management server 102 determines instead that there is an additional or remaining UPC of the master list of active UPCs, the method 200 loops back to block 206 in which the product source management server 102 compares the next UPC of the master list of active UPCs to the one or more UPCs of the manufacturer library 112.

Figure 4:
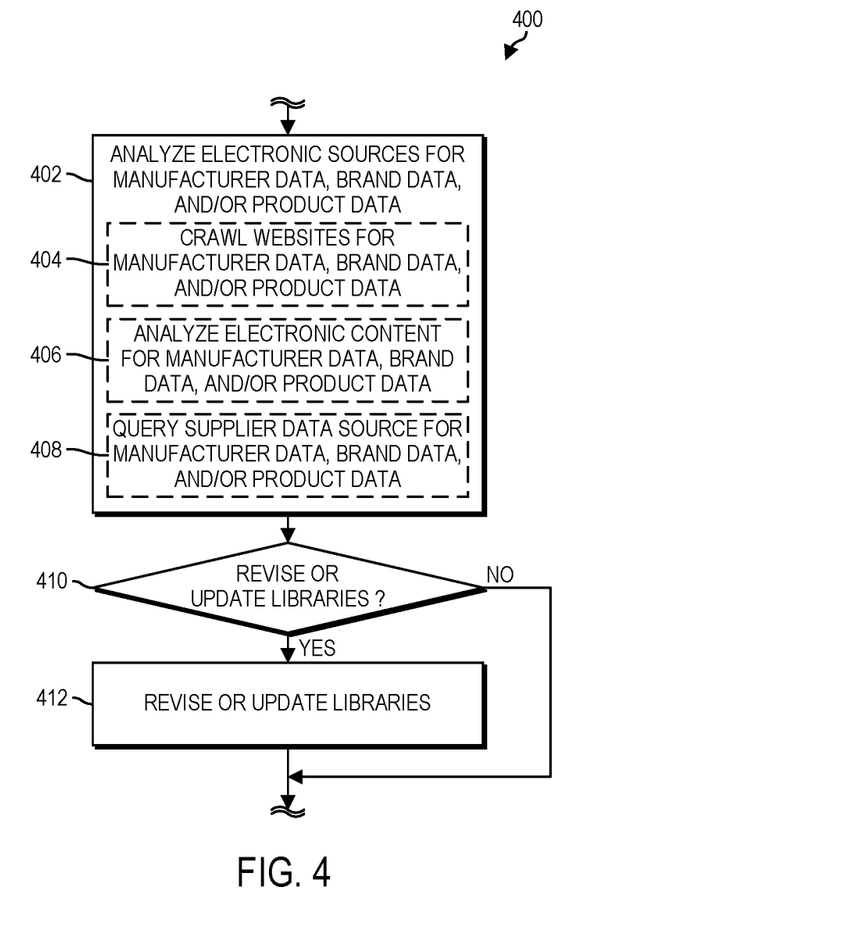
FIG. 4 is a simplified flow diagram of at least one embodiment of a method for updating and revising product source libraries that may be executed by the product source management server of FIG. 1.

Referring now to FIG. 4, a method 400 for updating and revising product source libraries that may be executed by the product source management server 102 begins with block 402. In block 402, the product source management server 102 analyzes electronic sources (e.g., the electronic data sources 140) to obtain new or revised manufacturer data, brand data, product data, or any other type of data stored in maintained in the manufacturer library 112, the brand identification library 114, and/or the product description string library 116. For example, in block 404, the product source management server 102 can crawl one or more websites (e.g., manufacturer websites, e-commerce sites, product review sites, blogs, social media, etc.) to obtain new or revised manufacturer data, brand data, and/or product data. In another example, in block 406, the product source management server 102 can analyze electronic content (e.g., electronic inventory lists, product lists, advertisements, etc.) for manufacturer data, brand data, and/or product data. Additionally or alternatively, in block 408, the product source management server 102 can query one or more supplier data sources (e.g., inventory databases, sales databases, etc.) to obtain new or revised manufacturer data, brand data, and/or product data.

In decision block 410, the product source management server 102 determines whether to revise or update the manufacturer library 112, the brand identification library 114, and/or the product description string library 116 based on the obtained new or revised manufacturer data, brand data, and/or product data. If, in decision block 410, the product source management server 102 determines that the manufacturer library 112, the brand identification library 114, and/or the product description string library 116 should be updated or revised, the method 400 advances to block 412. If, however, the product source management server 120 determines instead that the manufacturer library 112, the brand identification library 114, and/or the product description string library 116 should not be revised or updated, the method 400 terminates. In block 412, the product source management server 102 revises or updates the manufacturer library 112, the brand identification library 114, and/or the product description string library based on the obtained new or revised manufacturer data, brand data, and/or product data. In that way, the product source management server 102 can keep the data stored and/or maintained in the manufacturer library 112, the brand identification library 114, and/or the product description string library 116 updated.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method of identifying product sources, the method comprising:

receiving, by a product source management server, an unidentified Universal Product Code (UPC) that corresponds to a product of a manufacturer;

comparing, by the product source management server, the unidentified UPC to a preconfigured and preselected first library comprising a plurality of reference Universal Product Codes (UPCs), each reference UPC is associated with first manufacturer identification data that identifies the manufacturer of the product corresponding to the reference UPC, and each reference UPC is further associated with a product carried by the retailer;

identifying, by the product source management server and in response to a determination that the unidentified UPC matches one of the reference UPCs of the first library, the manufacturer of the product corresponding to the unidentified UPC as the manufacturer of the product corresponding to the matching reference UPC;

determining, by the product source management server and in response to a determination that the unidentified UPC does not match one of the reference UPCs of the first library, a brand of the product corresponding to the unidentified UPC based at least in part on product description data associated with the product;

comparing, by the product source management server, the determined brand of the product corresponding to the unidentified UPC to a second library comprising a plurality of reference brands, each reference brand is associated with second manufacturer identification data that identifies the manufacturer of the reference brand;

comparing, by the product source management server and in response to a determination that the determined brand of the product corresponding to the unidentified UPC does not match one of the reference brands of the second library, the product description data associated with the product to a third library, wherein the third library comprises a plurality of reference product descriptions strings, each reference product description string is associated with product identification data that identifies the product and brand corresponding to the reference product description string;

obtaining brand identification data from remote electronic sources, in response to a determination that the determined brand of the product corresponding to the unidentified UPC does not match one of the reference product description strings of the third library, by crawling the remote electronic sources for the brand identification data for the product associated with the unidentified UPC using the product source management server; and identifying, by crawling the remote electronic sources using the product source management server, the manufacturer of the product corresponding to the brand identification and the unidentified UPC, wherein the obtained brand identification data and the manufacturer for the product associated with the UPC are used by the product source management server to revise or update at least the second library.

2. The method of claim 1, further comprising generating, by the product source management server, a master list of unidentified UPCs for a retailer, wherein the master list comprises the unidentified UPC and a plurality of other unidentified UPCs, the unidentified UPC and the plurality of other unidentified UPCs each correspond to a different product of one or more manufacturers.

3. The method of claim 2, further comprising:

receiving, by the product source management server and from a remote computing device, a list comprising a plurality of active UPCs; and wherein generating the master list comprises generating the master list based at least in part on the plurality of active UPCs of the received list.

4. The method of claim 1, further comprising determining, by the product source management server, the product description data associated with the product corresponding to the unidentified UPC.

5. The method of claim 4, wherein determining the product description data comprises requesting the product description data associated with the product corresponding to the unidentified UPC from a remote product description repository.

6. The method of claim 4, wherein the product description data associated with the product corresponding to the unidentified UPC comprises at least one of a brand name, a product name, a product size, and a product weight.

7. The method of claim 1, wherein the product description data associated with the product corresponding to the unidentified UPC comprises a brand name of the product; and wherein determining the brand of the product corresponding to the unidentified UPC comprises parsing the product description data to obtain the brand name of the product.

8. The method of claim 1, further comprising generating, by the product source management server, a notification message indicating that the manufacturer of the product corresponding to the unidentified UPC could not be determined.

9. The method of claim 1, wherein the remote electronic sources comprise at least one of a remote manufacturer website, a remote e-commerce website, a remote news website, and a remote marketing server.

10. The method of claim 8, further comprising displaying, by the product source management server, the notification message via a display of the of the product source management server.

11. A product source management server for identifying product sources, the product source management server comprising:

at least one processor and non-transitory computer readable medium having instructions stored thereon which when executed by a processor cause the processor to:

receive an unidentified Universal Product Code (UPC) that corresponds to a product of a manufacturer;

compare the unidentified UPC to a preselected and preconfigured first library comprising a plurality of reference Universal Product Codes (UPCs), each reference UPC is associated with first manufacturer identification data that identifies the manufacturer of the product corresponding to the reference UPC, and each reference UPC is further associated with a product carried by the retailer;

identify, in response to a determination that the unidentified UPC matches one of the reference UPCs of the first library, the manufacturer of the product corresponding to the unidentified UPC as the manufacturer of the product corresponding to the matching reference UPC;

determine, in response to a determination that the unidentified UPC does not match one of the reference UPCs of the first library, a brand of the product corresponding to the unidentified UPC based at least in part on product description data associated with the product;

compare the determined brand of the product corresponding to the unidentified UPC to a second library comprising a plurality of reference brands, each reference brand is associated with second manufacturer identification data that identifies the manufacturer of the reference brand;

compare, in response to a determination that the determined brand of the product corresponding to the unidentified UPC does not match one of the reference brands of the second library, the product description data associated with the product to a third library, wherein the third library comprises a plurality of reference product description strings, each reference product description string is associated with product identification data that identifies the product and brand corresponding to the reference product description string;

obtain brain identification data from remote electronic sources, in response to a determination that the determined brand of the product corresponding to the unidentified UPC does not match one of the reference product description strings of the third library, by crawling the remote electronic sources for brand identification data for the product associated with the unidentified UPC; and identify, by crawling the remote electronic sources, the manufacturer of the product corresponding to the brand identification and the unidentified UPC, wherein the obtained brand identification data and the manufacturer for the product associated with the UPC are used by the product source management server to revise or update at least the second library.

* * * * *